United States Patent
Stahle

[11] 3,833,103
[45] Sept. 3, 1974

[54] ELECTROMAGNETIC, SPRING LOADED FRICTION ENGAGING MECHANISM WITH FLUX GAP LIMITING MEANS

[75] Inventor: Karl Stahle, Friedrichshafen, Germany

[73] Assignee: Zahnradfabrik Friedrichshafen, AG, Friedrichshafen, Germany

[22] Filed: Dec. 18, 1972

[21] Appl. No.: 316,073

[30] Foreign Application Priority Data
Dec. 23, 1971 Germany............................ 2164134

[52] U.S. Cl............................ 192/111 A, 188/71.8
[51] Int. Cl......................... F16d 65/52, F16d 65/56
[58] Field of Search..... 192/70.25, 84 B, 90, 111 A; 188/196 A, 71.8, 71.9

[56] References Cited
UNITED STATES PATENTS
3,613,838  10/1971  Pape................................ 192/84 B
3,613,849  10/1971  Pape................................ 192/84 B
3,624,767  11/1971  Kroeger......................... 192/111 A FOREIGN PATENTS OR APPLICATIONS
897,085    3/1945   France ............................ 192/84 B
1,146,690  11/1957  France................................. 192/90

Primary Examiner—Samuel Scott
Assistant Examiner—Allan Russell Burke

[57] ABSTRACT

Increase in the flux gap spacing between the magnetic body and armature of an electromagnetic spring loaded, friction engaging mechanism, is limited to a maximum permissible distance by a mechanical coupling between the magnetic body and an axial guide to which the armature is connected. A wear take-up device automatically adjusts distance advanced by the magnetic body toward the armature during release of the friction engaging mechanism.

6 Claims, 1 Drawing Figure

PATENTED SEP 3 1974　　　　　3,833,103
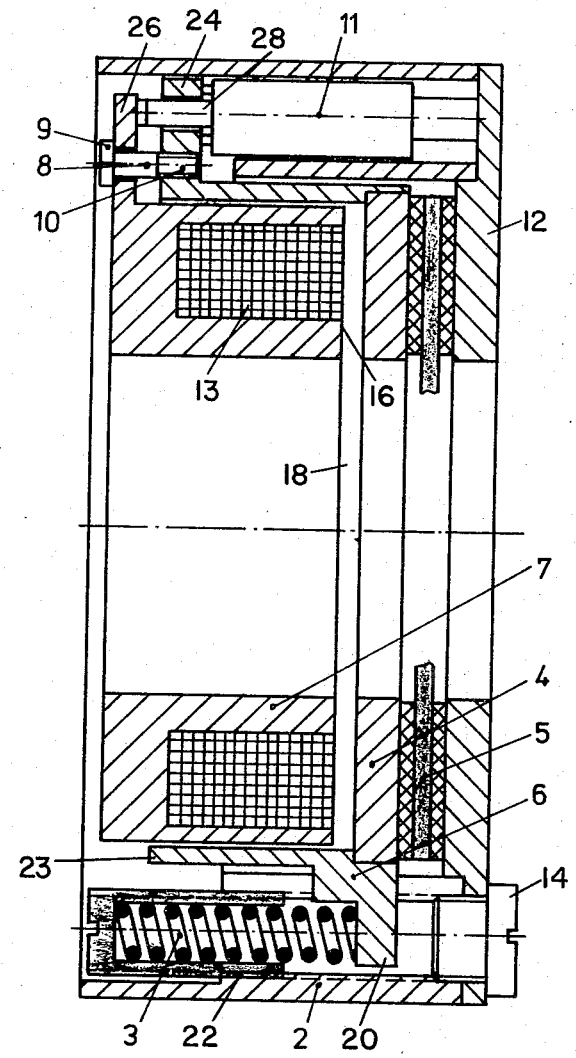

ELECTROMAGNETIC, SPRING LOADED FRICTION ENGAGING MECHANISM WITH FLUX GAP LIMITING MEANS

This invention relates to an electromagnetically controlled, spring loaded brake or clutch having automatic adjusting means.

In electromagnetically controlled engaging mechanisms, utilizing springs for biasing the armature into engagement with a friction disc, wear of the friction engaging surfaces increases the spacing between the flux emitting face of the magnetic body and the armature of the mechanism. While automatic wear take-up adjusting means are employed in such engaging mechanisms, to insure against any excessive increase in flux gap spacing that would bring the armature outside of the effective range of magnetic attraction of the magnetic body, various safety locks or additional compression springs have been proposed to deal with the problem.

An important object of the present invention, therefore, is to provide a comparatively simple yet more reliable structural arrangement for maintaining a constant maximum permissible spacing between the armature disc and the electromagnetic body of a spring engaged brake or clutch.

In accordance with the present invention, a mechanical coupling is installed within an electromagnetically controlled, spring biased brake for example, and is operative to limit the maximum amount by which the armature and magnetic body can move away from each other.

The invention will be described with respect to one exemplary embodiment shown in the drawing, which illustrates a longitudinal section view of a spring loaded brake mechanism. It will, however, be appreciated that the invention is similarly applicable to a spring engaged clutch mechanism.

Referring now to the drawing in detail, a plurality of compression springs 3 are peripherally distributed within a cylindrical housing 2 for axially biasing an armature disc 4 against a friction disc assembly 5. The friction disc assembly 5 is thus held in engagement by the armature under the bias of springs 3 with a backing disc 12 secured to the housing 2 by the fasteners 14. The brake is disengaged by energization of electromagnetic coils 13 in a magnetic body 7 having a flux emitting face 16 axially spaced by flux gap 18 from the armature disc 4. The magnetic attraction of the magnetic body must of course be sufficient to overcome the bias of the springs 3 when the flux gap 18 is maximum in order to effect disengagement of the brake.

The armature disc 4 is mounted for axially slidable, non-rotatable movement within the housing 2 by means of a guide member 6 having radial formations 20 at its forward end coplanar with the armature disc for engagement by the springs 3 which are seated within tubular spring adjusting members 22 that are threadedly mounted in the housing 2. The annular portion 23 of the guide member 6 encloses the magnetic body 7 and is provided at its rear axial end with radial projections 24 axially spaced from confronting radial extensions 26 of the magnetic body.

The magnetic body 7 is mechanically coupled to the armature disc 4 by means of bolts 8 having threaded end portions 10 connected to the radial projections 24 of the guide member to which the armature disc is connected. Each bolt 8 slidably extends through an opening in a radial, position-limiting extension 26 so that the magnetic body 7 may be axially displaced relative to the housing 2 by a head 9 on each bolt engaging the radial extensions. Axial movement of the magnetic body toward the armature disc in response to wear is automatically controlled by a mechanical type of automatic adjusting device 11 in order to maintain a constant clearance between the armature disc 4 and the friction disc assembly 5 when disengaged, regardless of wear. An automatic adjusting device of this type is disclosed, for example, in U.S. Pat. No. 3,543,888 and its details, therefore form no part of the present invention. Wear take-up movement of this type of device 11 occurs when extension 26 abuts part 28 after body 7 has moved from a maximum flux gap position as shown in response to energization of coil 13. Thus, this initial movement is automatically increased by device 11 by a distance equal to the wear of friction disc 5 so as to maintain the constant clearance aforementioned occasioned by an increase in the stroke of the armature 4. The maximum flux gap spacing therefore also remains constant.

While the bolt 8 will not limit axial movement of the magnetic body toward the armature disc during release of the brake, movement of the armature disc away from the magnetic body under the bias of springs 3 is llimited by the head 9 on the bolt, engaging the radial extension 26 of the magnetic body in the aforementioned maximum flux gap position. This will prevent any excessive increase in the spacing of flux gap 18 as the friction surfaces on the disc assembly 5 wear. The bolt 8 is therefore threadedly adjusted to position head 9 for the maximum permissible spacing of flux gap 18 within the effective range of magnetic attraction of the magnetic body. Thus, release of the brake is assured since magnetic attraction can never be reduced below the bias of springs 3 as a result of said increase in the stroke of the armature arising from wear of the friction disc assembly.

I claim:

1. In combination with a torque control engaging mechanism having an actuating magnet, a spring loaded armature and automatic adjusting means for controling displacement of the magnet relative to the housing, means for maintaining a maximum spacing between the magnet and the armature, including means for guiding movement of the magnet relative to the armature and mechanical coupling means operatively connected to the armature for engagement by the magnet in one position thereof to limit said relative movement between the magnet and the armature in one direction.

2. The combination of claim 1 wherein said mechanical coupling means comprises a bolt connected to the armature having a head portion engageable with the magnet.

3. The combination of claim 2 wherein said magnet includes an annular body having a radially projecting portion operatively engageable with the automatic adjusting means and the mechanical coupling means and a flux emitting face confronting the armature, said bolt extending through an opening in the radially projecting portion.

4. The combination of claim 3 wherein the torque control engaging mechanism includes a housing, a backing disc connected to the housing, a friction disc displaceable into engagement with the backing disc by the armature, and spring means for biasing the armature into engagement with the friction disc.

5. The combination of claim 2 wherein the torque control engaging mechanism includes a housing, a backing disc connected to the housing, a friction disc displaceable into engagement with the backing disc by the armature, and spring means or biasing the armature into engagement with the friction disc, said guide casing having a radial formation engaged by the spring means for biasing the armature.

6. In combination with a torque control engaging mechanism having an actuating magnet, a wear take-up adjusting device for automatically varying the position to which the magnet is initially displaced when energized and an armature continously biased to an operative position spaced from the magnet by a flux gap, means for establishing a maximum flux gap spacing including position limiting means mounted on the magnet for engagement with the wear take-up adjusting device in response to displacement of the magnet in one direction reducing the flux gap, means for guiding movement of the armature relative to the magnet through a stroke varied by the wear, and coupling means connected to the armature for abutting the position limiting means in a position of the magnet spaced from the armature by said maximum flux gap spacing to maintain the spacing of the maximum flux gap constant.

* * * * *